United States Patent [19]

Hashimoto et al.

[11] 4,218,876

[45] Aug. 26, 1980

[54] COMBINED TIMEKEEPER AND CALCULATOR WITH LOW POWER CONSUMPTION FEATURES

[75] Inventors: Shintarou Hashimoto, Shiki; Hirohide Nakagawa, Sakurai; Toshio Nishimura, Kyoto, all of Japan

[73] Assignee: Sharp Kabushiki Kaisha, Osaka, Japan

[21] Appl. No.: 854,214

[22] Filed: Nov. 23, 1977

[30] Foreign Application Priority Data

Nov. 29, 1976 [JP] Japan .................................. 51-145452

[51] Int. Cl.² .......................... G06F 1/00; G04C 23/00
[52] U.S. Cl. ..................................... 368/10; 364/705; 364/707; 368/76
[58] Field of Search ........................... 58/152 R, 23 R; 364/569, 705, 707

[56] References Cited

U.S. PATENT DOCUMENTS

| | | | |
|---|---|---|---|
| 3,813,533 | 5/1974 | Cone et al. ........................ | 58/152 R |
| 3,922,526 | 11/1975 | Cochran .............................. | 364/707 |
| 3,941,989 | 3/1976 | McLaughlin et al. ............... | 364/707 |
| 3,955,355 | 5/1976 | Luce .................................... | 58/152 R |
| 4,035,627 | 7/1977 | Dickinson et al. ................. | 58/152 R |
| 4,109,315 | 8/1978 | Pan ..................................... | 58/152 R |
| 4,156,281 | 5/1979 | Hirano et al. ....................... | 58/152 R |
| 4,158,285 | 6/1979 | Heinsen et al. ...................... | 364/705 |

*Primary Examiner*—Gene Z. Rubinson
*Assistant Examiner*—Forester W. Isen
*Attorney, Agent, or Firm*—Birch, Stewart, Kolasch & Birch

[57] ABSTRACT

A combined timekeeper and calculator implemented on an LSI semiconductor chip includes a generator stage for generating basic clock signals and system clock signals which are obtainable by modifying the basic clock signals, and a processor stage responsive to the supply of the system clock signals for performing the operations required for the timekeeper mode and calculator mode. The basic clock signals also are modified to create second signals useful in the timekeeper mode. The generator to supply the processor unit with the system clock signals while the second signal is being generated. Upon completing the operations by the processor unit, a clock control circuit prevents the processor unit from being supplied with the system clock signals.

15 Claims, 5 Drawing Figures

C-MOS ROM/RAM scheme

COMBINED TIMEKEEPER AND CALCULATOR WITH LOW POWER CONSUMPTION FEATURES

BACKGROUND OF THE INVENTION

The present invention relates to an LSI semiconductor chip which reduces power consumption.

Nowadays, CMOS-LSI semiconductor chips have been employed in a wide range of battery-powered electronic apparatus because there is a requirement for a reduction in power consumption. For example, an electronic digital timekeeper have employed CMOS-LSI semiconductor chips including Rom-Ram schemes. In the case where such timekeepers are additionally provided with the conventional calculator functions, power dissipation incurred within a power battery are significantly increased. Thus, reduction therefor in power consumption is desirable.

SUMMARY OF THE INVENTION

Accordingly, the present invention overcomes the problems noted above with the prior art by providing the integrated circuit device of this invention.

On the integrated circuit device of the present invention there are provided means for generating a string of basic clock signals, and means for generating a string of system clock signals by modifying the basic clock signals. Additionally, there is provided means for establishing a second signal derived from the basic clock signals for timekeeping purposes. Operations required for timekeeping purposes are accomplished by a processor section included within the integrated circuit device. The main feature of the present invention resides in that there is provided a clock control means for permitting the processor section to be enabled with the system clock signals in response to development of the second signal and for preventing the system clock signals from being fed to the processor section when the timekeeping operations have been completed by the processor section.

In one preferred form of the present invention, the integrated circuit device or LSI chip includes a ROM-RAM scheme performs the function of timekeeping which is implemented with an oscillator, a frequency divider, and a digital liquid crystal display. The LSI chip is selectively operable in either of two operating modes by controlling supply of the system clock signals. During one of the two operating modes the whole of the LSI system except the frequency divider and a clock control for a display buffer is at a halt while information is being held in the RAM (random access memory). During the other operating mode the LSI system is entirely enabled. As stated above, the LSI system includes a frequency divider the outputs of which are processed as information. Transition from the first-named mode to the second-named mode is responsive to development of the signals from the frequency divider or external input signals sensed. Retransmission from the second-named mode to the first-named mode is carried out by a program stored in the ROM-RAM scheme. The frequency divider provides the system clock signals which are useful to generate back plate signals and segment signals for display purposes.

BRIEF DESCRIPTION OF THE DRAWINGS

Other objects and novel features of the present invention are set forth in the appended claims and mode of operation will best be understood from a consideration of the following detailed description of the embodiments taken in connection with accompanying drawings, wherein:

DETAILED DESCRIPTION OF THE INVENTION

Figure 1:
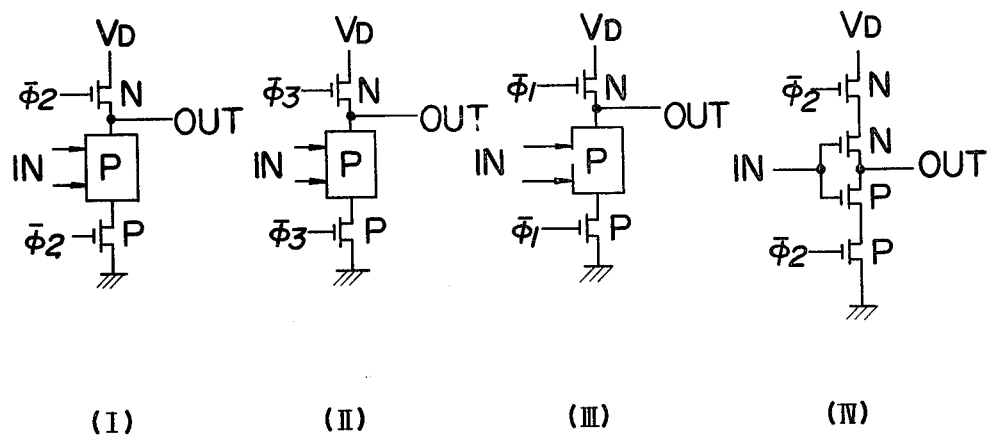
FIG. 1 is a block diagram of several logic unit circuits used with an LSI semiconductor chip of the present invention.
Figure 2:
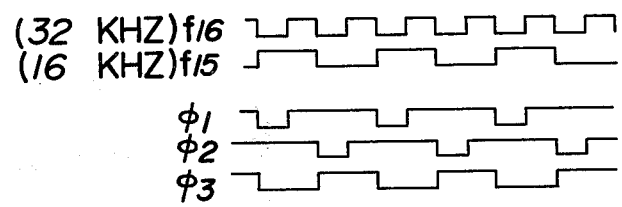
FIG. 2 is a waveform diagram of clock signals.

Referring now to FIG. 1, there are illustrated several typical logic unit circuits I, II, III, and IV which are basic components of an LSI semiconductor chip of the present invention. Description as to how to combine these logic unit circuits is omitted because it is not necessary to an understanding of the present invention. In FIG. 1, P-channel MOS transistors are labeled "P" while N-channel MOS transistors are labeled "N." System clock signals having the waveform illustrated in FIG. 2 are labeled "$\phi_1$, $\phi_2$ and $\phi_3$."

Figure 3:
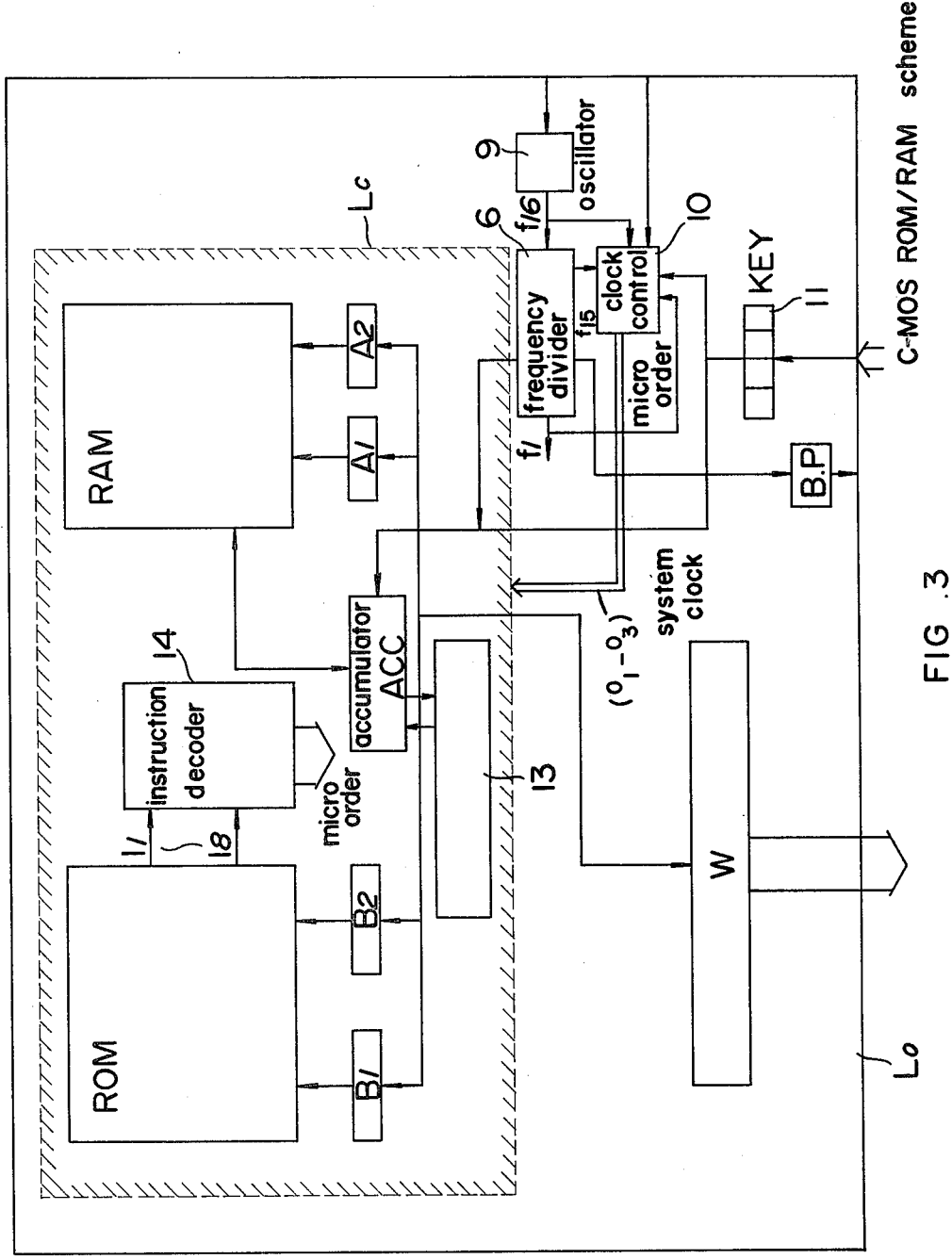
FIG. 3 is a block diagram of the implementation of the LSI semiconductor chip of the present invention.

FIG. 3 illustrates a schematic diagram of one preferred form of the present invention which is provided with the timekeeper function and calculator function.

A MOS-LSI semiconductor chip labeled "$L_o$" having a timekeeper function and a calculator function, includes a central processor unit $L_c$, a key input buffer 11, a display output register W and a display signal generator BP, these components being well known in the art of an electronic calculator. Furthermore, the LSI semiconductor chip $L_o$ includes a read only memory ROM storing a variety of program routines, a random access memory RAM for storage of a plurality of pieces of information, a digit selection register $B_1$ for the ROM, a page selection register $B_2$ for the ROM, an accumulator register ACC, a digit selection register $A_1$ for the RAM, a page selection register $A_2$ for the RAM, an instruction decoder for decoding outputs $I_1$–$I_8$ from the ROM into microinstructions, an adder, etc.

A display buffer register W stores selected ones of the pieces of information contained within the RAM. A generator BP provides enabling signals for a digital liquid crystal display. The key buffer register 11 temporarily stores key signals.

The LSI semiconductor chip $L_o$ further comprises a quartz oscillator 9, a frequency divider 6 for providing timekeeping signals as well known in the art of an electronic timekeeper, and a clock control 10 to be described hereinafter.

With such an arrangement, basic clock signals $f_{16}$ from the oscillator 9 are fed to the frequency divider 6 which in turn changes them into second signals $f_1$. The clock control 10 receives the basic clock signal $f_{16}$ and a frequency signal $f_{15}$ formed within the frequency divider 6 and produces the system clock signals $\phi_1$–$\phi_3$. The system clock signals $\phi_1$–$\phi_3$ are supplied to the LSI chip $L_c$ and the like. The LSI chip consumes power while being supplied with the system clock signals $\phi_1$–$\phi_3$.

Upon supply of the system clock signals $\phi_1$–$\phi_3$ the LSI chip may operate in either of the two operating modes, that is, the timekeeper mode or the calculator mode. The contents of the ROM are converted into the microinstructions Ⓐ, Ⓑ, ... through the instruction decoder 14. The microinstructions are effective to control accumulator ACC, registers $A_1$, $A_2$, adder 13, etc. The arithmetic operations required for the calculator mode are upon these microinstructions.

Though the timekeeper operations are carried out in substantially the same manner, in this case all that is necessary is to add the second signal $f_1$ to the region of the RAM holding timekeeping information, change desired portions of timekeeping information such as date, hours, and minutes and modify the display register W.

Arithmetic operations procedures used in the timekeeper mode in the sense of the present invention are as follows: after a second has passed away, (I) the procedure by which "1" is added to a second counter provided within the RAM; (II) the procedure which effects sexagesimal compensation upon memories storing the timekeeper information such as month, date, hour, minute, etc.; (III) the procedure by which timekeeper information such as month, date, hour, minute, etc., is transmitted into the output register W; and (IV) the procedure which effects comparison with wake up time, etc., to provide alarm sounds. On the other hand the arithmetic operations used in the calculator mode are arithmetic operations responsive to depression of respective keys, for example, four-rule calculations.

The system clock signals $\phi_1$-$\phi_3$ are provided only during the above-described arithmetic operations. In the timekeeper mode it takes only about 3 msec. to complete the timekeeping operations which should be carried out each time a second has passed away. On the other hand, the arithmetic operations in the calculator mode needs periods of time from 200 to 500 msec. Accordingly, in the timekeeper mode, power consumption is incurred only for 3 msec. for each second of operation. In contrast, power consumption in the calculator mode is incurred for as much as 500 msec.

Pursuant to the teachings of the present invention, the development of the system clock signals $\phi_1$-$\phi_3$ is suppressed except when the above-described arithmetic operations are being processed, thereby enabling a reduction in power consumption incurred within the LSI semiconductor chip. Of course, the timekeeper information should be held in the display buffer register W and the RAM even when the system clock signals are suppressed.

The suppression of the system clock signals means that the level of the system clock signals $\phi_1$-$\phi_3$ is always restricted to a low level during the suppressed period. It will be apparent from FIG. 1, that, when the respective ones of the system clock signals $\phi_1$-$\phi_3$ are at a low level, the gates of load MOS transistors (the N channel type) of the logic unit circuit are held at a high level so that the load transistors are turned on and switching transistors (the P channel type) are turned off.

Therefore, the logic unit circuits are in the steady state without power consumption. In the case of the inverter circuit leveled "IV," clocked load MOS transistor (N) and switching MOS transistor (P) are placed into the on state so that the output assumes the reverse form of the input applied thereto. However, the input to the inverter circuit IV remains unchanged and thus the inverter circuit IV is held in the steady state thereafter, without incurring power consumption.

For example, for a CMOS/LSI semiconductor chip containing approximately 7000-8000 MOS-FET elements, power consumption was reduced to approximately 30 $\mu$W during the non-arithmetic operation period while the same was at most 200 $\mu$W during the arithmetic operation period, provided that the system clock signals are suppressed during the non-operation period as taught by the present invention.

Operation of the above-described LSI chip will be discussed with reference to the flow chart of FIG. 5. Respective steps $S_1$-$S_{10}$ illustrated in the flow chart describe the following events.

$S_1$ ... decision as to whether a second signal has been developed $S_2$ ... the oscillator 6 supplies the respective components with the clock signals $\phi_1$-$\phi_3$ $S_3$ ... addition of "1" to the second counter within the RAM $S_4$ ... compensation as to month, date, hour, minute, etc.

$S_5$ ... the register W is refreshed with new timekeeper information $S_6$ ... comparison with time set for generating an alarm signal $S_7$ ... generate alarm signal (not shown within the LSI chip)

$S_8$ ... the oscillator ceases supplying the system with clock signals $\phi_1$-$\phi_3$ $S_9$ ... decision as to whether any key has been operated, through the use of the key buffer register 11

$S_{10}$ ... the arithmetic operation in the calculator mode $S_{11}$ ...

Figure 4:
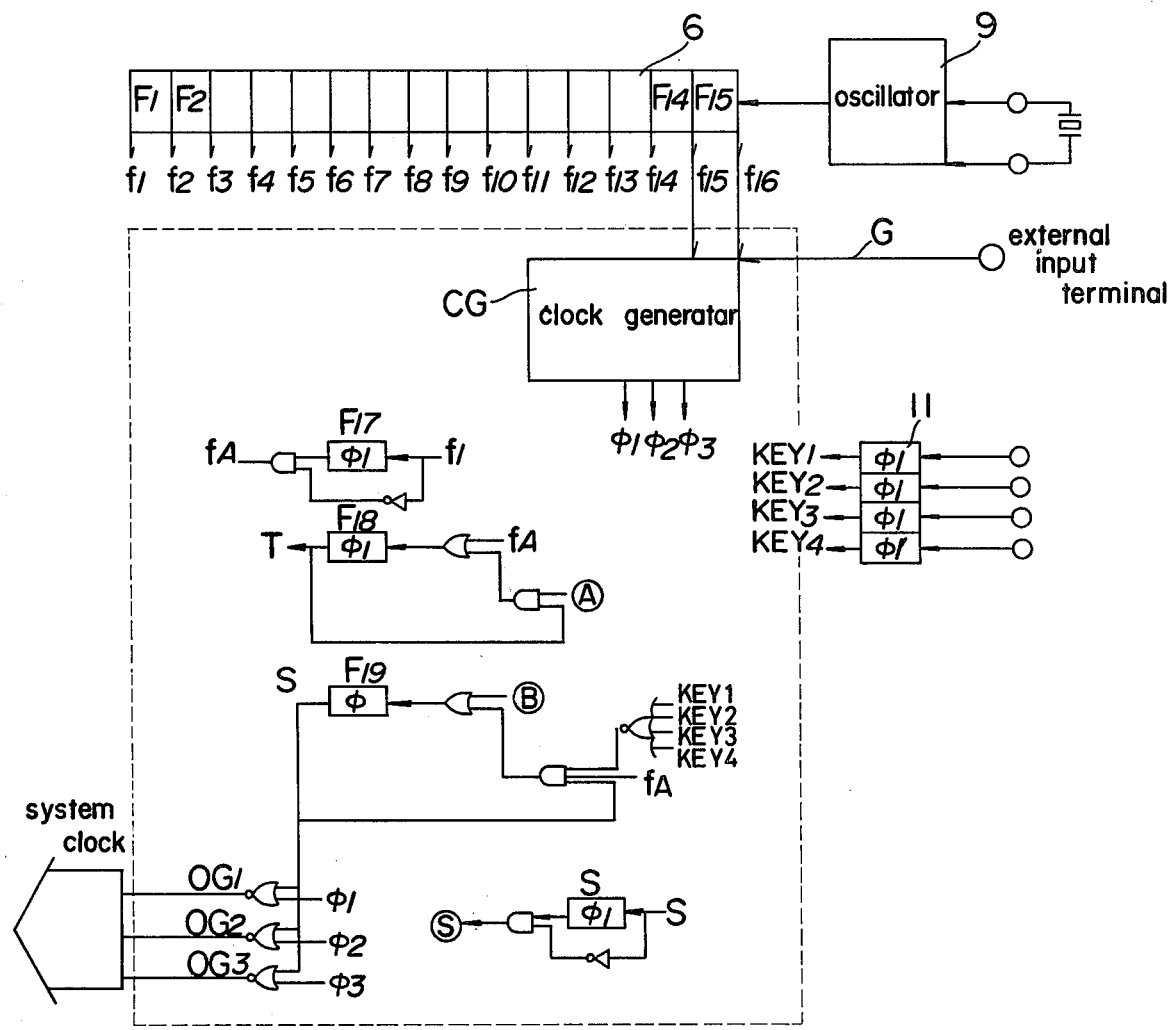
FIG. 4 is a more detailed diagram of the implementation of the LSI semiconductor chip shown in FIG. 3.
Figure 5:
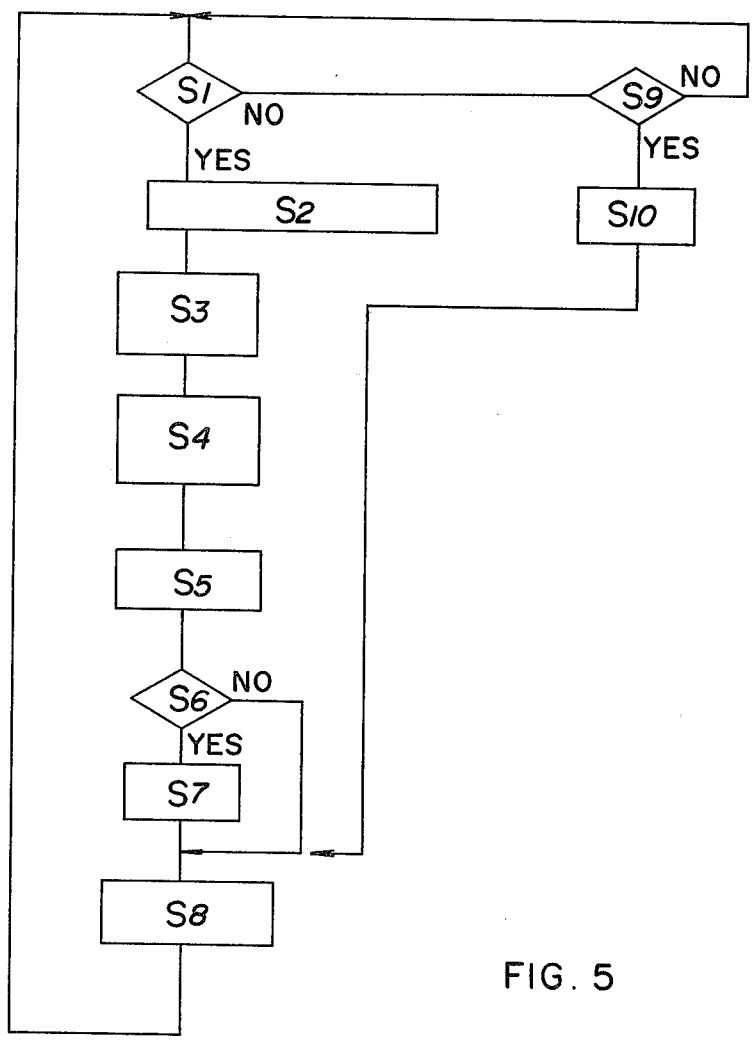
FIG. 5 is a flow chart showing a variety of events occurring within the implementation shown in FIG. 3.

A sequence of the respective steps shown in FIG. 5 is advanced under control of the clock control 10. The construction of the clock control 10 is illustrated in FIG. 4.

The quartz oscillator 9 provides the oscillation output of about 32 KHz, for example, as shown by $f_{16}$ in FIG. 2. 32.768 KHz is desirable.

A 15-bit binary counter $F_1$-$F_{15}$ is adapted to count the oscillation output $f_{16}$ of 32.768 KHz. The output $F_1$ of the first stage $F_1$ of the counter reaches "1" each time a second has passed away. As a result, the $f_1$ corresponds exactly to the second signals as stated previously.

Meantime, the system clock signals $\phi_1$-$\phi_3$ are formed from the signals $f_{15}$ and $f_{16}$ from the counter. The signals $f_{15}$ and $f_{16}$ are depicted in FIG. 2, the later $f_{16}$ being the input of the last stage $F_{15}$ of the counter or the output of the oscillator and the former being the output of the last stage $F_{15}$. $\phi_1$-$\phi_3$ are obtainable by the following logical equations. The logic is implemented with the clock generator CG.

$$\phi_1 = \overline{f_{16} \cdot f_{15}} = \overline{f_{16}} + \overline{f_{15}}$$

$$\phi_2 = \overline{f_{16} \cdot \overline{f_{15}}} = \overline{f_{16}} + f_{15}$$

$$\phi_3 = \overline{f_{15}}$$

One of the major features of the present LSI semiconductor chip is that the system clock signals $\phi_1$-$\phi_3$ are formed through a simple gating scheme by utilizing the signals occurring within the frequency divider. $\phi_1$-$\phi_3$ are applied to NOR gates $OG_1$-$OG_3$. Transmission of $\phi_1$-$\phi_3$ is under control of a control signal S to be described later. In other words, when S=1 the outputs $\phi_1$–$\phi_3$ of the NOR gates $OG_1$–$OG_3$ are all at a low level and when $S=0$ $\phi_1$–$\phi_3$ are transmitted without any changes therein. A signal $f_A$ is provided for synchronizing the second signal $f_1$ with the clock signal $\phi_1$ which is created each time a second has passed. The pulse width of the synchronizing signal $f_A$ corresponds to a bit time.

A flip flop $F_{18}$ is set by the signal $f_A$ and reset by the microinstruction Ⓐ with its output labeled "T". A flip flop $F_{19}$ is set by the microinstruction Ⓑ and reset by the outputs KEY 1–KEY 4 of the key input buffer register 11 or the signal $f_A$ with its output corresponding to the control signal S. It will be noted that the microinstruction Ⓑ is derived in the step $S_8$ of FIG. 5.

In accordance with the LSI chip of the present invention, whether the second signal is generated is decided in the step $S_1$. If an affirmative answer is given, then the timekeeping operation will be carried out in the order of $S_2$–$S_8$. Conversely, if the second signal is not sensed, there is a decision as to whether the key input has developed. Whether the key input has developed is decided through the use of the signal T outputted from the flip flop $F_{18}$ rather than the $f_1$ signal. The reason why such one-second decision is relied upon the signal T and not the signal $f_A$ is to enable the timekeeping operation to go on even when the second signal $f_A$ is developed on the way to completing the arithmetic operations in the calculator mode responsive to the key depression. In other words, $T=1$ upon the development of the $f_A$ signal whether or not the LSI chip is processing arithmetic operations and also $T=1$ thereafter even if $f_A=0$. The one-second decision of step S will be reverted to again after completing the arithmetic operations. Then, when the one-second decision is finished, the flip flop $F_{18}$ output T is reset in response to the microinstruction Ⓐ. Briefly speaking, when the second signal is developed in the calculator mode while executing the arithmetic operation, the second signal is sensed and should be held for a while. Thereafter, the arithmetic operations for timekeeping purposes are not allowed in response to the second signal unless the required arithmetic operation is terminated in the calculator mode.

In this instance, the procedure for adding "1" to the second counter would be retarded at most 500 msec. This does not matter because the LSI chip is still in the calculator mode and the display provides a visual display of the results of the calculation operation and not the timekeeper information. In addition, the arithmetic operations for timekeeping purposes needs only about 3 msec. In the event that the second signal is developed just after the arithmetic operation has started in the calculator mode, the second information never gets out of order in the cycle. This is due to the fact that the timekeeping operations could be executed within 3 msec after the expiration of 500 msec.

As noted earlier, the generation of the system clock signals $\phi_1$–$\phi_3$ is governed by the signal S, which is set by the microinstruction Ⓑ and reset by the output T of the key input buffer 11 or the one-second signal $f_A$.

The microinstruction Ⓑ is released at the end of the flow chart of FIG. 5, namely, the end of the calculation operations or the timekeeping operations. This signal could be termed an arithmetic operation completion signal.

In other words, the signal S assumes a logic "1" for the period of time which extends from the completion of the calculation operations or the timekeeping operations to the development of the one-second signal or the depression of any key for the calculator mode. This results in that the outputs of the gates $OG_1$–$OG_3$ are being forced into the logic "0" state (or a low level). Little power is consumed under these circumstances. However, it will be noted that the clock control, the oscillator, and the frequency divider always are in the operative state with accompanying power consumption.

In this manner, the LSI semiconductor chip of the present invention is adapted to prevent the generation of the system clock signals $\phi_1$–$\phi_3$ except when the arithmetic operations are being executed when in either the calculator mode or in the timekeeper mode, thereby reducing power consumption.

The standard frequency of the oscillator 9 is 32 KHz and the operation frequency in the calculator mode relied upon the standard frequency is reduced to 16 KHz. Therefore, the four-rule calculations in the calculator mode require time of about 500 msec in the case of eight-digit capacitory. However, the ten-digit or twelve-digit capacity needs a much longer time exceeding the limit of one-second to execute calculations. In another preferred form of the present invention, the LSI semiconductor chip is provided with an external clock signal terminal G for application of much higher frequency clock signals to the clock control 10 to speed up execution of the arithmetic operations. Whether the output of the internal oscillator or the output of the external oscillator is utilized is optional.

The LSI chip of the present invention can be modified to manifest stopwatch functions wherein the counter $F_1$–$F_4$ is divided with each of the divisions having 4 bits and the contents of the respective divisions are utilized as timekeeping information for a stopwatch. For example, through the use of microinstructions ①, ②, ③ and ④ the contents of $F_1$–$F_{15}$ are transmitted into the respective bits $ACC_1$–$ACC_4$ of the accumulator register ACC in the following fashion; information of $f_4$–$f_1$ enters into $ACC_4$–$ACC_1$ in response to the microinstruction 1; information of $f_8$–$f_{15}$ enters into $ACC_4$–$ACC_1$ in response to the microinstruction ②; information of $f_{12}$–$f_9$ enters into $ACC_4$–$ACC_1$ in response to the microinstruction ③; and information of $f_{16}$–$f_{13}$ enters into $ACC_4$–$ACC_1$ in response to the microinstruction ④.

The stopwatch function is performed as follows: firstly, the frequency divider ceases counting in response to a stop input; secondly, the contents of the frequency divider are transferred via the accumulator into a specific region of the RAM in response to any one of the microinstructions ① through ④ selected in accordance with a desired degree of accuracy; and lastly, the information stored in the RAM is visually displayed via the W register as information on the order of less than a second.

Moreover, the LSI chip of the present invention can be provided with the conventional time alarm function. This is accomplished by utilizing the fact that the operating frequencies of the respective stages of the frequency divider are within the range of 1 KHz–32 KHz. When comparison of actual time with the alarm time selected shows coincidence, the output of the desired stage of the frequency divider is utilized to provide an alarm signal enabling a speaker. If the frequency of the alarm signal is selected at 1 KHz to produce an audible sound, then the output of $F_{12}$ will be most preferable because $F_{15}$ in=32 KHz, $F_{15}$ out=16 KHz, $F_{14}=8$ KHz, $F_{13}=4$ KHz, and $F_{12}=2$ KHz.

After time coincidence, the microinstruction ③ is provided to transfer $f_{12}$-$f_9$ into ACC. The contents of ACC are loaded into the desired region of the RAM. Decision is carried out as to whether the specific position of the RAM storing information of $f_{12}$ assumes a logic "1". If an affirmative answer is provided, a flip flop labeled "AL" is inverted.

The output of the flip flop AL is used to enable the operator while the above operation is repeated. The flip flop AL is inverted each time $f_{12}$ assumes a logic "1." Because the frequency of $f_{12}$ is 2 KHz, the frequency of the flip flop AL reaches 1 KHz.

While only certain embodiments of the present invention have been described, it will be apparent to those skilled in the art that various changes and modifications may be made therein without departing from the spirit and scope of the invention as claime.

We claim:

1. An integrated circuit device having a timekeeping function comprising:
   a generator stage for generating basic clock signals and system clock signals, said system clock signals being obtainable by modifying said basic clock signals;
   a processor stage responsive to supply of said system clock signals for executing the operations required for the timekeeping function, said processor stage including a ROM (read only memory)-RAM (random access memory) combination; and
   clock control means for preventing said processor stage from being supplied with said system clock signals upon completion of the operations required for said timekeeping function.

2. The integrated circuit device as set forth in claim 1 wherein said integrated circuit device comprises a large number of MOS-FET elements.

3. The integrated circuit device as set forth in claim 1 the frequency of said basic clock being about 32 KHz generated by a quartz oscillator.

4. The integrated circuit device as set forth in claim 1 wherein said system clock signals comprise three distinctly phased clock signals.

5. An integrated circuit device having at least a timekeeping function comprising:
   a generator stage for generating basic clock signals and system clock signals, said system clock signals being obtainable by modifying said basic clock signals;
   means for establishing a one-second signal from said basic clock signals useful for performing the timekeeping function;
   a processor unit responsive to the supply of said system clock signals for executing the operation required for the timekeeping function; and
   a clock control for permitting said processor unit to be enabled with said system clock signals in response to the development of said one-second signal and for preventing said system clock signals from being fed to said processor unit when the operation required for the timekeeping function in response to said one-second signal has been completed.

6. The integrated circuit device as set forth in claim 5 wherein said operation required for the timekeeping function is executed only for a very short period of time compared to a one-second period.

7. The integrated circuit device as set forth in claim 5 wherein said operation required for the timekeeping function includes the addition of "one" to seconds information when each second has passed away.

8. The integrated circuit device as set forth in claim 7 wherein a frequency divider develops said one second signal in response to the output of said basic clock signals.

9. An integrated circuit device having a timekeeping mode and a calculator mode comprising:
   an oscillator for generating basic clock signals;
   a frequency divider responsive to said basic clock signals for generating intermediate clock signals and one-second signals useful in the timekeeper function;
   a clock generator responsive to said intermediate clock signals from said frequency divider for generating system clock signals;
   a processor unit responsive to supply of said system clock signals for executing arithmetic operations required for both the timekeeper function and the calculator function; and
   clock control means connected to said frequency divider for permitting said processor unit to be enabled with said clock signals in response to the development of said one-second signals and for preventing said system clock signals from being fed to said processor unit when the arithmetic operation required for the timekeeper function responsive to said one-second signal has been completed.

10. The integrated circuit device as set forth in claim 9 wherein said clock control comprises logical gate means responsive to a control signal which is developed for a period of time from the completion of the timekeeping operations or the calculator operations to the development of the one-second signal or any of the calculator key inputs.

11. The integrated circuit device as set forth in claim 10 wherein said control signal is derived from a logical gate means responsive to the one-second signal from said frequency divider and the calculator key inputs.

12. The integrated circuit device as set forth in claim 10 further comprising an external clock input terminal for receipt of external clock signals having a frequency higher than the frequency of said basic clock signal, said higher frequency clock signals being useful in the calculator mode.

13. The integrated circuit device as set forth in claim 9 wherein said frequency divider comprises a plurality of divider stages, a specific stage of which provides an output useful as stopwatch information.

14. The integrated circuit device as set forth in claim 9 wherein said frequency divider comprises a plurality of divider stages a specific stage of which provides an output useful for generating an alarm signal.

15. A method of operating an integrated circuit device with a timekeeper function and a calculator function having an oscillator for generating clock signals and a one-second signal, and a processor unit for executing arithmetic operations required for the timekeeper function and the calculator function comprising the steps of:
   deciding whether said one-second signal has been developed;
   permitting supply of said clock signals to said processor unit if said one-second signal has been developed;
   executing addition of "one" to timekeeping information in units of seconds;

effecting a required update of timekeeping information in units of seconds, minutes, and hours;
renewing the contents of registers associated with readout of said units of updated timekeeping information;
preventing said oscillator from supplying said processor unit with said clock signals after renewing of said register;
deciding whether any key for the calculator function has been operated; and
executing the calculator function in the presence of the operation of any of said keys.

* * * * *